United States Patent [19]

McCaulou

[11] 4,255,842

[45] Mar. 17, 1981

[54] TIRE STUD REMOVER

[76] Inventor: Robert L. McCaulou, Rte. 1, New Plymouth, Id. 83655

[21] Appl. No.: 85,887

[22] Filed: Oct. 17, 1979

[51] Int. Cl.[3] .............................................. B23P 19/02

[52] U.S. Cl. ........................................ 29/235; 29/270; 29/426.6

[58] Field of Search ................. 29/235, 270, 278, 280, 29/426.6, 815, 450

[56] References Cited

U.S. PATENT DOCUMENTS

| | | | |
|---|---|---|---|
| 3,400,443 | 9/1968 | Miller | 29/450 |
| 3,504,414 | 4/1970 | Breen | 29/815 |
| 3,696,494 | 10/1972 | Mackal et al. | 29/235 |

*Primary Examiner*—James L. Jones, Jr.
*Attorney, Agent, or Firm*—Paul F. Horton

[57] ABSTRACT

A tire stud remover having a handle and a tubular portion, adapted to receive the shaft of a tire stud, outwardly extending from the handle. The exterior surface of the tubular portion includes one or more substantially funnel-shaped protuberances extending backwardly from the outer most tip of the tubular portion, each of the protuberances having its conical portion faced outwardly for improved insertion into the tread of a tire. The tire stud remover may include a plurality of tubular portions which are removeably attached to the handle to accommodate tire studs of varying size. A closeable compartment for storage of the tubular portions may be included.

6 Claims, 4 Drawing Figures

TIRE STUD REMOVER

BACKGROUND OF THE INVENTION

1. Field of the Invention

This invention relates, in general, to tire stud removers, and in particular, to the tire stud removers having an improved insertion member.

2. Description of the Prior Art

The problems associated with removal of tire studs have long been recognized. The conventional manner of removing the studs is by use of either an ice pick or a narrow screwdriver inserted along the shaft of the stud until the base of the stud is reached. The pick or screwdriver is then worked against the compression of the tire until the removal tool engages the back surface of the base of the stud and the stud is pressed out of the retaining aperture.

The method is time consuming and inefficient and may result in damage to the tire. To overcome these disadvantages, stud removers, as typified by the remover disclosed by W. P. Miller II, U.S. Pat. No. 3,400,443 are currently in use. Such removers, however, are not widely used because of the difficulty of insertion of the tubular stud-shaft engaging member into the recess of the tire holding the stud. It has been found that this difficulty arises primarily because of the large surface area of the tool engaging the tire. Further disadvantages of present stud removers are their inability to remove studs of varying sizes such as are found on automobiles and trucks. Additionally, the tubular member of such removers are invariably found mounted at right angles to the handle portion of the remover which effectively prevents tire stud removal of studs on mounted tires as may be found in fender wells.

SUMMARY OF THE INVENTION

The present invention comprises a tire stud remover having a handle and a tubular portion removeably attached at an obtuse angle to the longitudinal axis of the handle. The invention further includes at least one infundibularform protuberance adjacent the free end of the tubular member. Provisions for storing tubular members adapted to receive stud shafts of varying diameters is also included. A more comprehensive description of the invention may be found in the appended claims.

It is therefore a primary object of the present invention to provide a tire stud remover having an improved tubular insertion member to decrease the friction between the insertion member and the tire during insertion.

It is a further object of the present invention to provide a tire stud remover which is adaptable to varying sizes of studs.

It is a still further object of the present invention to provide a tire stud remover having a storage compartment for varying sizes of insertion members.

Another object of the present invention is to provide a tire stud remover having a tubular insertion portion that is at an obtuse angle to the longitudinal axis of the handle.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
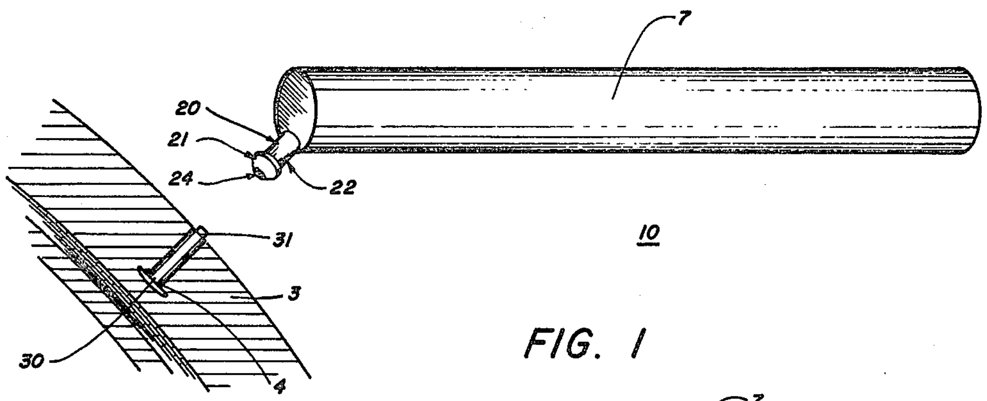
FIG. 1 is a perspective view of one embodiment of the present invention showing a singular infundibularform protuberance on the insertion tube.

Referring now to FIG. 1, one embodiment of a tire stud remover made according to the present invention is disclosed.

Tire stud remover 10 includes a handle 7, which may be cylindrical in shape and of sufficient length and diameter to comfortably fit the hand, and a tubular portion 20 attached to the handle and defining a cylindrical cavity 24 insertable over the shaft 31 of tire stud 30 of tire 3.

Tubular portion 20 is provided in one embodiment with an infundibularform protuberance 21 adjacent the terminal free end of portion 20. It will be noted that protuberance 21 is of a greater external diameter than the external diameter of the remaining portion of the tube. The conical shape of the outer most portion of the protuberance serves as a wedge to force the rubber tread of tire 3 away from the recess 4 holding the stud 30. The base portion of the protuberance being wider than neck portion 22 prevents contact of the rubber of the tire along the length of shaft 22 thereby providing a minimum of frictional contact between tube portion 20 and the walls of recess 4 upon insertion.

Figure 2:
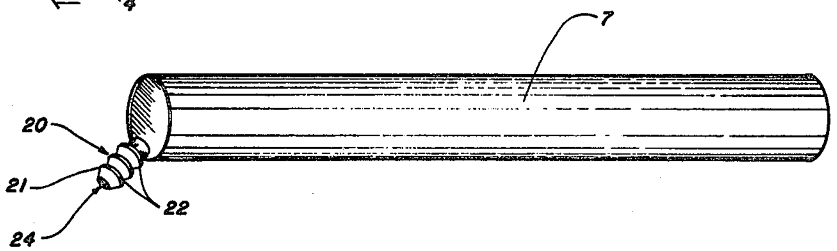
FIG. 2 is a perspective view of a second embodiment of the present invention showing a plurality of infundibularform protuberances on the insertion member.
Figure 3:
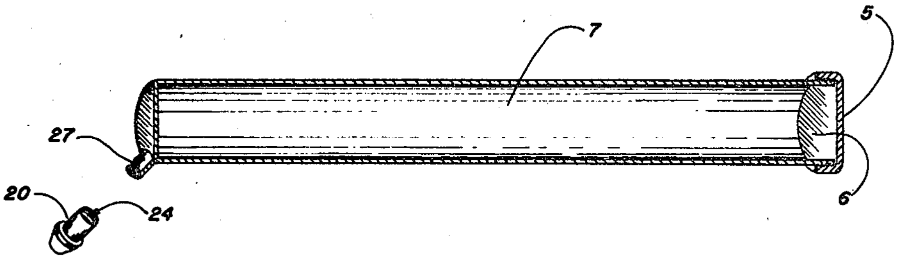
FIG. 3 is a sectional view showing removeable insertion tube and the insertion tube storage compartment.

In another embodiment of the present invention, as shown to advantage in FIG. 2, tubular member 20 includes a plurality of aligned infundibularform protuberances designated generally by the numeral 22, functioning substantially the same as forward protuberance 21, but giving additional support to the shaft. Tubular portion 20 may be welded directly to a metallic handle 7, preferably at an obtuse angle to the longitudinal axis of the cylindrical handle, as shown, or in the alternative may be removably attached as shown in FIG. 3. One preferred means of removably attaching tubular portion 20 to handle 7 is to provide a threaded bolt portion 27 attached to handle 7 by welding or otherwise and a mateable tubular portion 20 which threadingly engages bolt portion 27 to hold the tubular portion in place. In this manner it will be noted that tubular portions 20 of varying sizes and adapted to engage tire studs of varying sizes, may be mounted onto handle 7. This is particularly important where both automobile tire studs and truck tire studs must be removed.

Handle 7, at an end opposing the attachment of tube portion 20, may be provided with a compartment 6 formed as a cavity in the handle, to hold the varying removable tubular portions 20. The Handle Compartment 6 is closeable by means of threaded screw cap 5 which engages threads of handle 6.

Figure 4:
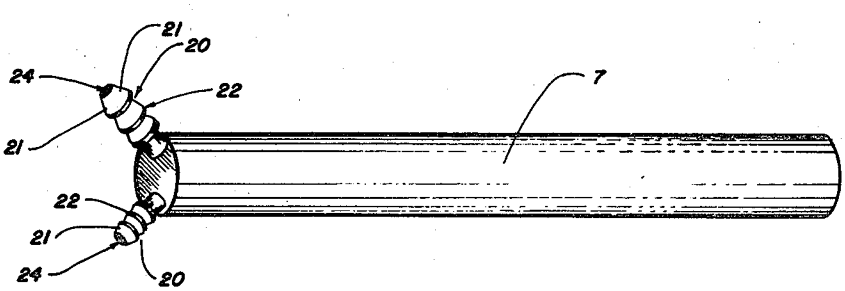
FIG. 4 is another embodiment of the present invention showing two insertion tubes of varying sizes attached to a common handle.

Another embodiment of the present invention is shown in FIG. 4. In this embodiment two or more tube portions 20 of varying size may be attached to a common handle 7, obviating the need for removability and for a handle compartment. Each of the tube portions include the infundibularform protuberances 21 and 22 as on the previously disclosed embodiments.

In operation, and assuming a tire stud remover as shown in FIG. 3, the operator first chooses from the tube portions contained within compartment 6 of handle 7 a tube portion 20 which will fit the tire stud being removed. He then attaches the selected tube portion to the handle by screwing the tube portion firmly onto bolt 27. Grasping handle 7 firmly, the operator then forces protuberance 21 into recess 4 of tire 3 with the cavity 24 surrounding shaft 31 of tire stud 30. Because of the small contact surface between protuberance 21 of tube portion 20 and the rubber wall of recess 4, the tube portion is easily wedged into the recess until contact is made with the base of the stud. The handle is then pivoted using the stud as a fulcrum and the stud is readily removed from the tire. The stud is then slipped from cavity 24 of tire stud remover 10 and the remover is then ready to engage another stud for removal. Once the task is completed, tube portion 20 is removed from the handle and placed in compartment 5 for storage.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A tire stud remover comprising:

a handle; and at least one tube portion outwardly extending from said handle, each of said tube portions defining a cylindrical orifice adapted to receive a tire stud and each of said tube portions having a substantially infundibulform portuberance adjacent the terminal free end of said tube portion.

2. The apparatus as described in claim 1 wherein each of said tube portions include a plurality of substantially infundibulform protuberances aligned on the exterior surface thereof.

3. The apparatus as described in claim 1 wherein each of said tube portions are removably attached to said handle and wherein each of said tube portions is adapted to receive tire studs of varying diameters.

4. The apparatus as described in claim 3 wherein said handle includes a closeable compartment adapted to receive said tube portions.

5. A tire stud remover comprising:

a cylindrical handle defining at one end thereof a closeable compartment operable to receive a plurality of tubular portions; and at least one tubular portion outwardly and removably extending from an opposing end of said handle at an angle obtuse to the longitudinal axis of said handle, each of said tubular portions defining a cylindrical orifice adapted to receive the shaft of a tire stud and each of said tubular portions including an infundibularform protuberance on its exterior surface adjacent the terminal end of said tubular portion.

6. The apparatus as described in claim 5 wherein each of said tubular portions include on its exterior surface a plurality of aligned infundibularform protuberances, the outermost protuberance having its conical portion outwardly positioned and each succeeding protuberance having its conical portion juxtaposed adjacent the base of an adjacent protuberance.

* * * * *